United States Patent
Mimura et al.

(10) Patent No.: US 6,345,147 B1
(45) Date of Patent: Feb. 5, 2002

(54) MULTI-LANGUAGE RECORDING MEDIUM AND REPRODUCING DEVICE FOR THE SAME

(75) Inventors: Hideki Mimura; Kazuhiko Taira, both of Yokohama (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/068,895

(22) PCT Filed: Nov. 22, 1996

(86) PCT No.: PCT/JP96/03429

§ 371 Date: May 22, 1998

§ 102(e) Date: May 22, 1998

(87) PCT Pub. No.: WO97/19451

PCT Pub. Date: May 29, 1997

(30) Foreign Application Priority Data

Nov. 24, 1995 (JP) .............................. 7-305965

(51) Int. Cl.$^7$ ................... H04N 5/928; H04N 5/781; H04N 5/83
(52) U.S. Cl. ............... 386/97; 386/105; 386/125
(58) Field of Search ................ 386/97, 96, 104, 386/105, 106, 102, 95, 107, 117, 124, 125, 126, 52, 55, 45, 46, 39, 40, 4; H04N 5/928, 5/781, 5/83

(56) References Cited

U.S. PATENT DOCUMENTS 5,617,407 A * 4/1997 Bareis ..................... 369/275.3
5,703,997 A * 12/1997 Kitamura et al. ............. 386/97

FOREIGN PATENT DOCUMENTS

| JP | 5-12831 | 1/1993 |
| JP | 5-46624 | 2/1993 |
| WO | WO95/12276 | 5/1995 |

OTHER PUBLICATIONS

Hirayama et al., Multi–Scene Recording Medium and Reproduction Apparatus, WO95/12197, May 1995.

Hirayama et al., Recording Medium which can Cope with Various Languages and Reproduction Apparatus, WO95/12198, May 1995.

* cited by examiner

Primary Examiner—Robert Chevalier
(74) Attorney, Agent, or Firm—Pillsbury Winthrop LLP

(57) ABSTRACT

An optical disk has a management area and a data area. In the data area, main picture information, sub-picture information used to construct streams in different languages, and audio information have been recorded. In the management area, attribute information used to identify each piece of sub-picture information on the streams has been recorded. The attribute information includes language code indicating kinds of language. The language code is supplemented with a code extension indicating differences in the size of characters and/or description obtained from the sub-picture information. Sub-pictures include a stream of easy-to-see large letters and a stream of easy-to-read letters intended for children.

13 Claims, 17 Drawing Sheets

CODE EXTENSION TABLE FOR SUB-PICTURE STREAMS

| 8BITS CODE VALUE | DESCRIPTION |
|---|---|
| 00h | NONE |
| 01h | CAPTION IN STANDARD-SIZED CHARACTERS |
| 02h | CAPTION IN LARGE-SIZED CHARACTERS |
| 03h | CAPTION FOR CHILDREN |
| 04h | RESERVED |
| 05h | CLOSED CAPTION IN STANDARD-SIZED CHARACTERS |
| 06h | CLOSED CAPTION IN LARGE-SIZED CHARACTERS |
| 07h | CLOSED CAPTION FOR CHILDREN |
| 08h | RESERVED |
| 09h | MANDATORY CAPTION |
| 0Ah | RESERVED |
| 0Bh | RESERVED |
| 0Ch | RESERVED |
| 0Dh | DIRECTOR'S COMMENTS IN STANDARD-SIZED CHARACTERS |
| 0Eh | DIRECTOR'S COMMENTS IN LARGE SIZE |
| 0Fh | DIRECTOR'S COMMENTS FOR CHILDREN |
| 10h~7Fh | RESERVED |
| 80h~FFh | DEFINITIONS MADE BY PRODUCER |

| VIDEO TITLE SET (VTS) | |
|---|---|
| VIDEO TITLE SET INFORMATION (VTSI) | (Mandatory) |
| VIDEO OBJECT SET FOR VIDEO SET MENU (VTSM_VOBS) | (Optional) |
| VIDEO OBJECT SET FOR VIDEO TITLE SET TITLE (VTSTT_VOBS) | (Mandatory) |
| BACKUP FOR VIDEO TITLE SET INFORMATION (VTSI_BUP) | (Mandatory) |

| | |
|---|---|
| VIDEO TITLE SET INFORMATION MANAGEMENT TABLE (VTSI_MAT) | (Mandatory) |
| VIDEO TITLE SET PART-OF-TITLE SEARCH POINTER TABLE (VTS_PTT_SRPT) | (Mandatory) |
| VIDEO TITLE SET PROGRAM CHAIN INFORMATION TABLE (VTS_PGCIT) | (Mandatory) |
| VIDEO TITLE SET MENU PGCI UNIT TABLE (VTSM_PGCI_UT) | (Mandatory when VTSM_VOBS exists) |
| VIDEO TITLE SET TIME MAP TABLE (VTS_TMAPT) | (Optional) |
| VIDEO TITLE SET MENU CELL ADDRESS TABLE (VTSM_C_ADT) | (Mandatory when VTSM_VOBS exists) |
| VIDEO TITLE SET MENU VIDEO OBJECT UNIT ADDRESS (VTSM_VOBU_ADMAP) | (Mandatory when VTSM_VOBS exists) |
| VIDEO TITLE SET CELL ADDRESS TABLE (VTS_C_ADT) | (Mandatory) |
| VIDEO TITLE SET MENU VIDEO OBJECT ADDRESS MAP (VTS_VOBU_ADMAP) | (Mandatory) |

FIG. 6

VIDEO TITLE SET INFORMATION MANAGEMENT TABLE
VTSI_MAT

| RBP | | DESCRIPTION | NO. OF BYTES |
|---|---|---|---|
| 0~11 | VTS_ID | VTS IDENTIFICATION | 12 |
| 12~15 | VTS_EA | VTS END ADDRESS | 4 |
| 16~27 | RESERVED | RESERVED | 12 |
| 28~31 | VTSI_EA | VTSI END ADDRESS | 4 |
| ⋮ | ⋮ | ⋮ | |
| 514~515 | VTS_AST_Ns | NUMBER OF AUDIO STREAMS IN VTS | 2 |
| 516~579 | VTS_AST_ATRT | AUDIO STREAM ATTRIBUTE TABLE FOR VTS | 64 |
| 580~595 | RESERVED | RESERVED | 16 |
| 596~597 | VTS_SPST_Ns | NUMBER OF SUB-PICTURE STREAMS IN VTS | 2 |
| 598~789 | VTS_SPST_ATRT | SUB-PICTURE STREAM ATTRIBUTE TABLE FOR VTS | 192 |
| ⋮ | ⋮ | ⋮ | |

FIG. 7

DEFINITION OF SPECIFIC CODE FIELD (NORMAL)

| HIGH-ORDER BITS | LOW-ORDER BITS | LANGUAGE |
|---|---|---|
| CODE OF THE FIRST LETTER OF LANGUAGE SYMBOL | CODE OF THE SECOND LETTER OF LANGUAGE SYMBOL | LANGUAGE DETERMINED IN ISO-639 |

FIG. 9A

DEFINITION OF SPECIFIC CODE FIELD (ADDITIONAL)

| HIGH-ORDER BITS | LOW-ORDER BITS | LANGUAGE |
|---|---|---|
| FFh | 00h | TAIWANESE |
| | 01h | CANTONESE |
| | 02h | etc. |
| | 03 to FFh | RESERVED |

FIG. 9B

CODE EXTENSION TABLE FOR SUB-PICTURE STREAMS

| 8BITS CODE VALUE | DESCRIPTION |
| --- | --- |
| 00h | NONE |
| 01h | CAPTION IN STANDARD-SIZED CHARACTERS |
| 02h | CAPTION IN LARGE-SIZED CHARACTERS |
| 03h | CAPTION FOR CHILDREN |
| 04h | RESERVED |
| 05h | CLOSED CAPTION IN STANDARD-SIZED CHARACTERS |
| 06h | CLOSED CAPTION IN LARGE-SIZED CHARACTERS |
| 07h | CLOSED CAPTION FOR CHILDREN |
| 08h | RESERVED |
| 09h | MANDATORY CAPTION |
| 0Ah | RESERVED |
| 0Bh | RESERVED |
| 0Ch | RESERVED |
| 0Dh | DIRECTOR'S COMMENTS IN STANDARD-SIZED CHARACTERS |
| 0Eh | DIRECTOR'S COMMENTS IN LARGE SIZE |
| 0Fh | DIRECTOR'S COMMENTS FOR CHILDREN |
| 10h~7Fh | RESERVED |
| 80h~FFh | DEFINITIONS MADE BY PRODUCER |

FIG. 10

EXAMPLE OF SUB-PICTURE STREAMS A

| | TYPE | SPECIFIC CODE | SPECIFIC CODE EXTENSION |
|---|---|---|---|
| STREAM NO. 0 | 10 (LANGUAGE) | en (ENGLISH) | 01h (NORMAL CHARACTERS) |
| STREAM NO. 1 | 10 (LANGUAGE) | en (ENGLISH) | 02h (LARGE-SIZED CHARACTERS) |
| STREAM NO. 2 | 10 (LANGUAGE) | ja (JAPANESE) | 01h (NORMAL CHARACTERS) |
| STREAM NO. 3 | 10 (LANGUAGE) | ja (JAPANESE) | 02h (LARGE-SIZED CHARACTERS) |

FIG. 11A

EXAMPLE OF SUB-PICTURE STREAMS B

| | TYPE | SPECIFIC CODE | SPECIFIC CODE EXTENSION |
|---|---|---|---|
| STREAM NO. 0 | 10 (LANGUAGE) | ja (JAPANESE) | 01h (NORMAL CHARACTERS) |
| STREAM NO. 1 | 10 (LANGUAGE) | en (ENGLISH) | 01h (NORMAL CHARACTERS) |
| STREAM NO. 2 | 10 (LANGUAGE) | ja (JAPANESE) | 02 (LARGE-SIZED CHARACTERS) |
| STREAM NO. 3 | 10 (LANGUAGE) | ja (JAPANESE) | 03h (CHARACTER FOR CHILDREN) |

DEFINITION OF SPECIFIC CODE EXTENSION FIELD

| 8BIT CODE VALUE | DESCRIPTION |
|---|---|
| 01h | STANDARD-SIZED CHARACTERS |
| 02h | MIDDLE-SIZED CHARACTERS |
| 03h | LARGE-SIZED CHARACTERS |
| 04h | HIRAGANA CHARACTERS |
| 05h | KATAKANA CHARACTERS |
| 06h TO 07h | etc. (RESERVED) |
| 08F 0Eh | USER DEFINED |

→ GERMAN
→ ENGLISH
→ JAPANESE

CODE EXTENSION TABLE FOR AUDIO STREAMS

| 8BIT CODE VALUE | DESCRIPTION |
|---|---|
| 00h | NONE |
| 01h | STANDARD CAPTION |
| 02h | SPEECH FOR VISUALLY HANDICAPPED PERSONS |
| 03h | DIRECTOR'S COMMENTS (1) |
| 04h | DIRECTER'S COMMENTS (2) |
| 05h TO 7Fh | RESERVED |
| 80h TO FFh | DEFINITIONS MADE BY PRODUCER |

MENU SCREEN

| STREAM NO. 0 | ENGLISH | NORMAL SIZE |
|---|---|---|
| STREAM NO. 1 | ENGLISH | LARGE SIZE |
| STREAM NO. 2 | JAPANESE | STANDARD SIZE |
| STREAM NO. 3 | JAPANESE | LARGE-SIZED CHARACTERS |

MENU SCREEN

| STREAM NO. 0 | JAPANESE | STANDARD SIZE |
|---|---|---|
| STREAM NO. 1 | ENGLISH | NORMAL SIZE |
| STREAM NO. 2 | JAPANESE | LARGE-SIZED CHARACTERS |
| STREAM NO. 3 | JAPANESE | CHARACTER FOR CHILDREN |

| STREAM NO. 0 | ENGLISH | NORMAL SIZE |
| --- | --- | --- |
| STREAM NO. 1 | ENGLISH | LARGE SIZE |
| STREAM NO. 2 | JAPANESE | STANDARD-SIZED CHARACTERS |
| STREAM NO. 3 | JAPANESE | LARGE-SIZED CHARACTERS |
| STREAM NO. 4 | JAPANESE | HARAGANA CHARACTERS |
| STREAM NO. 5 | | |
| STREAM NO. 6 | | |
| STREAM NO. 7 | | |

MULTI-LANGUAGE RECORDING MEDIUM AND REPRODUCING DEVICE FOR THE SAME

TECHNICAL FIELD

This invention relates to a system for recording information on a recording medium, such as an optical disk, or reproducing the information recorded on the medium, and more particularly to a recording medium on which multilingual information has been recorded and a reproducing system for the recording medium.

BACKGROUND ART

In recent years, optical disks on which compressed video information, sub-picture information, and audio information are recorded have been developed. The optical disks have the sub-picture information and audio information recorded on them in various languages. In playback, any one of the languages can be chosen by an application program running on the reproducing system. The sub-picture information includes subtitles and captions added to movies. Such optical disks can be produced for use in many countries where people speak different languages.

When the sub-picture information is reproduced and subtitles appear on the display, it sometimes seems to the viewer that the letters are too small to read or the words are too difficult to understand, because the language and vocabulary have been determined by the producer beforehand.

DISCLOSURE OF INVENTION

Accordingly, an object of the present invention is to provide a multilingual recording medium that enables users to select standard language and standard size subtitles as well as easy-to-see large letters, plain words intended for children, and even commentary in the same language, and a reproducing system for the multilingual recording medium.

Another object of the present invention is to provide a multilingual recording medium that enables users to select from, not only normal speech in a language, but also plain speech intended for children, and even commentary speech in the same language, and a reproducing system for the multilingual recording medium.

The foregoing objects are accomplished by providing a recording medium having a data area in which main picture information, sub-picture information for constructing streams, are recorded along with audio information and a management area in which attribute information used to identify the streams has been recorded, the multilingual recording medium characterized in that the attribute information is supplemented with specific codes indicating kinds of language and a code extension indicating differences in the size of characters and/or description in the same language, and the data area has a stream of the sub-picture information determined by the specific code and code extension recorded in it.

Furthermore, a recording medium of the present invention contains a data area in which main picture information and sub-picture information used to construct sub-picture streams, and audio information used to construct audio streams have been recorded and a management area in which attribute information used to identify the sub-picture streams and the audio streams have been recorded.

The attribute information is supplemented with sub-picture specific code indicating the kinds of language used in sub-pictures and a sub-picture code extension indicating differences in the size of characters and/or description in the same language. The attributes information also contains audio specific codes which indicate the kinds of language used in audio and an audio code extension which indicates the differences in description in the same language.

The data area has a stream of the sub-picture information which is determined by the sub-picture specific code and the sub-picture code extension and the audio stream is determined by the audio specific code and audio code extension recorded in it.

Furthermore, a reproducing system of the present invention comprises a means for reading the data from the management area, for recognizing the contents of the attribute information, for tabulating pieces of information on the streams, and for displaying the contents of each stream on playback in the form of a menu screen. Also, playback means for reproducing the sub-picture information corresponding to the selected stream, when there has been an operation input to the effect that one of the pieces of information on the streams displayed on the menu screen will be chosen.

Still furthermore, a reproducing system of the present invention comprises a means for reading the data from the management area, for recognizing the contents of the attribute information, for tabulating pieces of information on the sub-picture streams and pieces of information on the audio streams, and for displaying the contents of each sub-picture stream and each audio stream on playback in the form of a menu screen. Also, playback means for reproducing the sub-picture information and audio information corresponding to the selected stream, when there has been an operation input to the effect that one of the pieces of information on the streams displayed on the menu screen will be chosen.

On playback of the information from the recording medium, it is possible to choose and display different character sizes, or a different description in the same language, or reproduce a different vocal description in the same language, (e.g., such as a vocal description with comments).

BRIEF DESCRIPTION OF DRAWINGS

FIG. 6 is an explanatory diagram showing the structure of the video title set recorded on the optical disk.

FIG. 7 shows the contents of the video title set information management table recorded on the optical disk.

FIG. 9A is a diagram to help explain specific codes in the sub-picture stream attribute table.

FIG. 9B is a diagram to help explain other specific codes in the sub-picture stream attribute table.

FIG. 10 is a table listing code extensions for sub-picture streams.

FIG. 11A is a diagram to help explain an example of sub-picture streams.

FIG. 11B is a diagram to help explain another example of sub-picture streams.

FIG. 12 is a diagram to help explain still another example of sub-picture streams.

FIG. 20 is a diagram to help explain another example of a sub-picture stream.

BEST MODE OF CARRYING OUT THE INVENTION

Hereinafter, referring to the accompanying drawings, an embodiment of the present invention will be explained.

Figure 1:
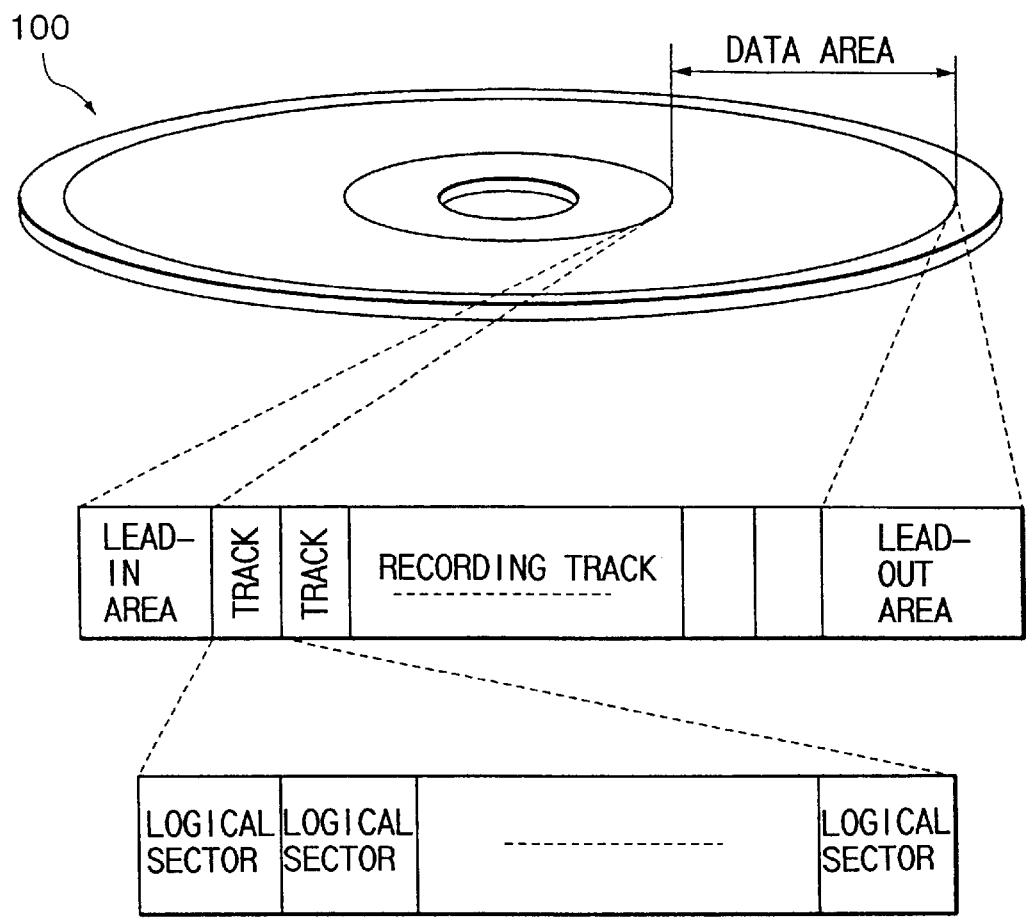
FIG. 1 is an explanatory diagram of an optical disk according to the present invention.

FIG. 1 schematically shows the recording data structure of an optical disk 100 as an example of an information retaining medium to which the present invention is applicable.

The optical disk 100 is a double-sided laminated disk, each side being able to store, for example, 5 gigabytes of data. There are a large number of tracks beginning at the lead-in area near the center of the disk and continuing to the lead-out area on the outer edge side of the disk. Each track consists of a lot of logical sectors. Each sector stores various types of information (suitably compressed digital data).

Figure 2:
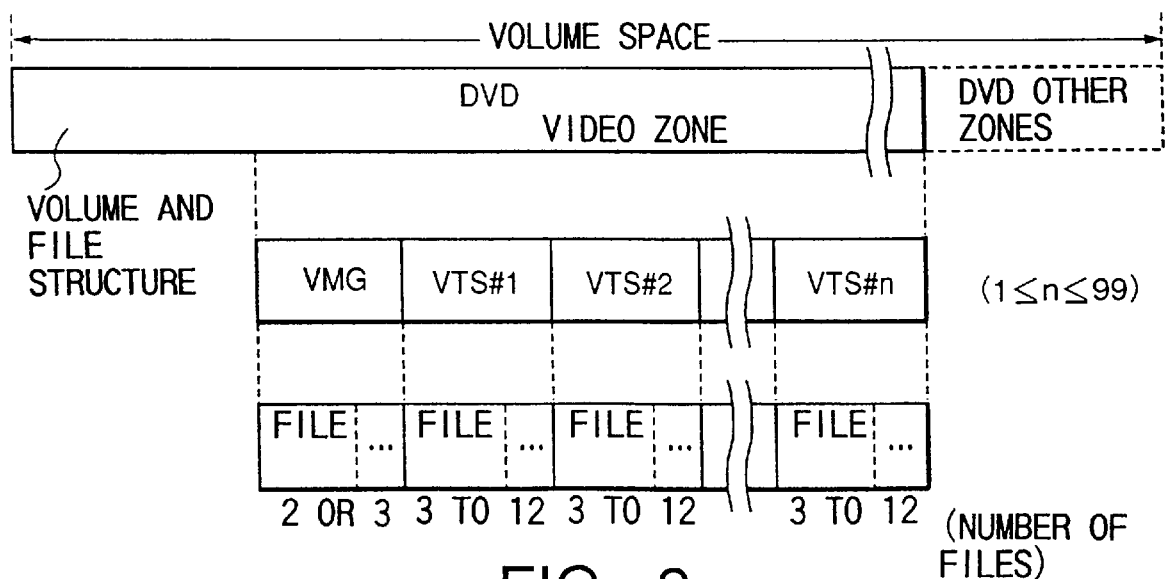
FIG. 2 shows a volume space for the information recorded on the optical disk.

FIG. 2 shows a volume space on the optical disk 100.

As shown in FIG. 2, the volume space is made up of a volume and file structure zone, a DVD video zone, and other zones. In the volume and file structure zone, a UDF (Universal Disk Format Specification Revision 1.02) bridge structure is written. The data can be read on a computer complying with a specific standard. The DVD video zone includes a video manager (VMG) and a video title set (VTS). The video manager (VMG) and video title set (VTS) are each composed of more than one file. The video manager (VMG) is information used to control the video title set (VTS).

Figure 3:
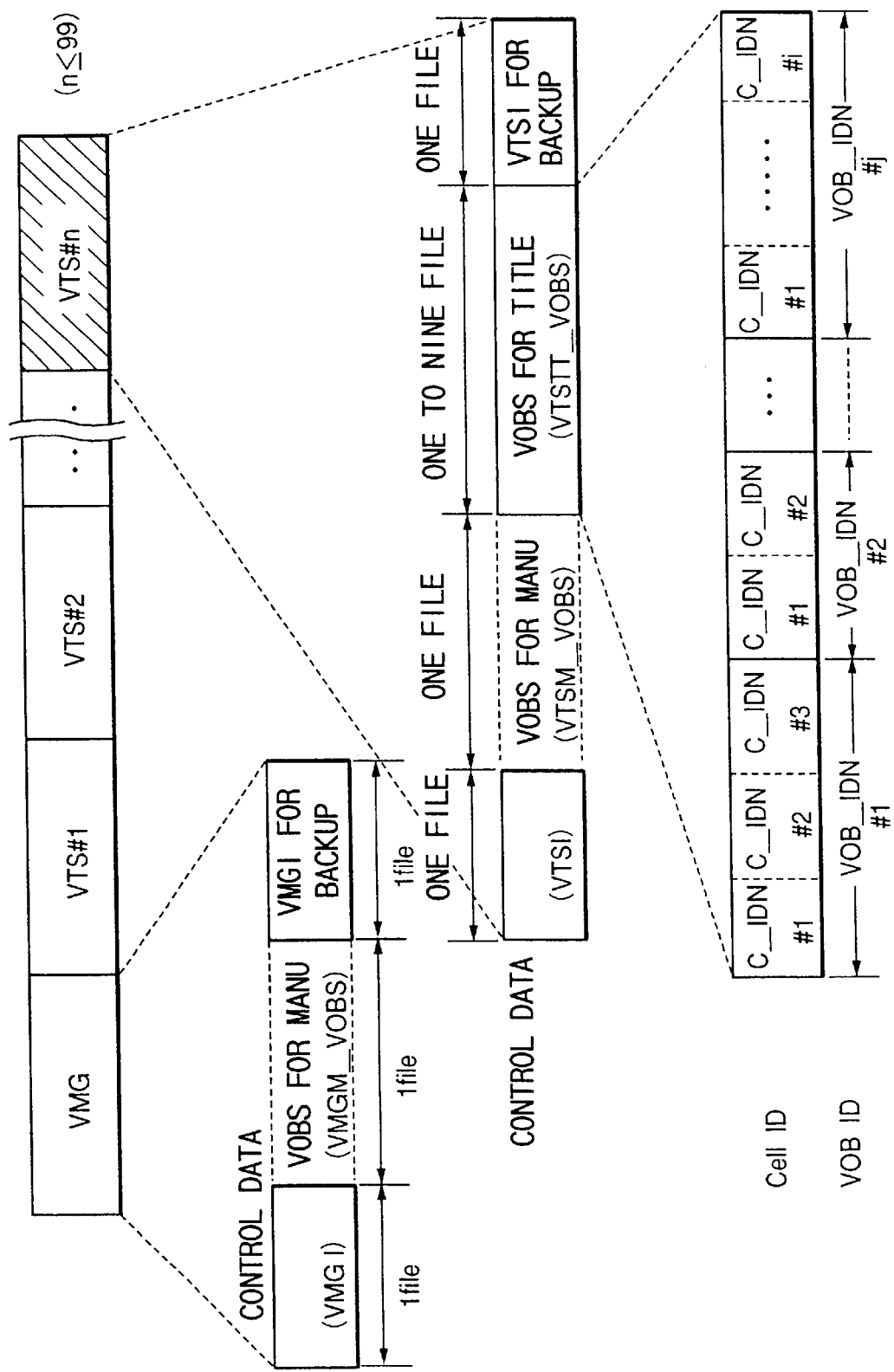
FIG. 3 is a diagram to help explain the structure of the files recorded on the optical disk.

FIG. 3 shows the structures of the video manager (VMG) and video title set (VTS) in further detail.

The video manager (VMG) includes video manager information (VMGI) serving as control data and a video object set (VMGM_VOBS) serving as data for menu display. It further includes backup video manager information (VMGI) having the same contents as those of the VMGI.

The video title set (VTS) includes video title set information (VTSI) serving as control data, a video object set (VTSM_VOBS) serving as data for menu display, and a video object set (VTSTT_VOBS) for the title of a video title set. The video title set is a video object set for video display. The video title set (VTS) further includes backup video title information (VTSI) having the same contents as those of the VMGI.

The video object set (VTSTT_VOBS) for video display consists of more than one cell (Cell). Each cell (Cell) is assigned a cell ID number.

Figure 4:
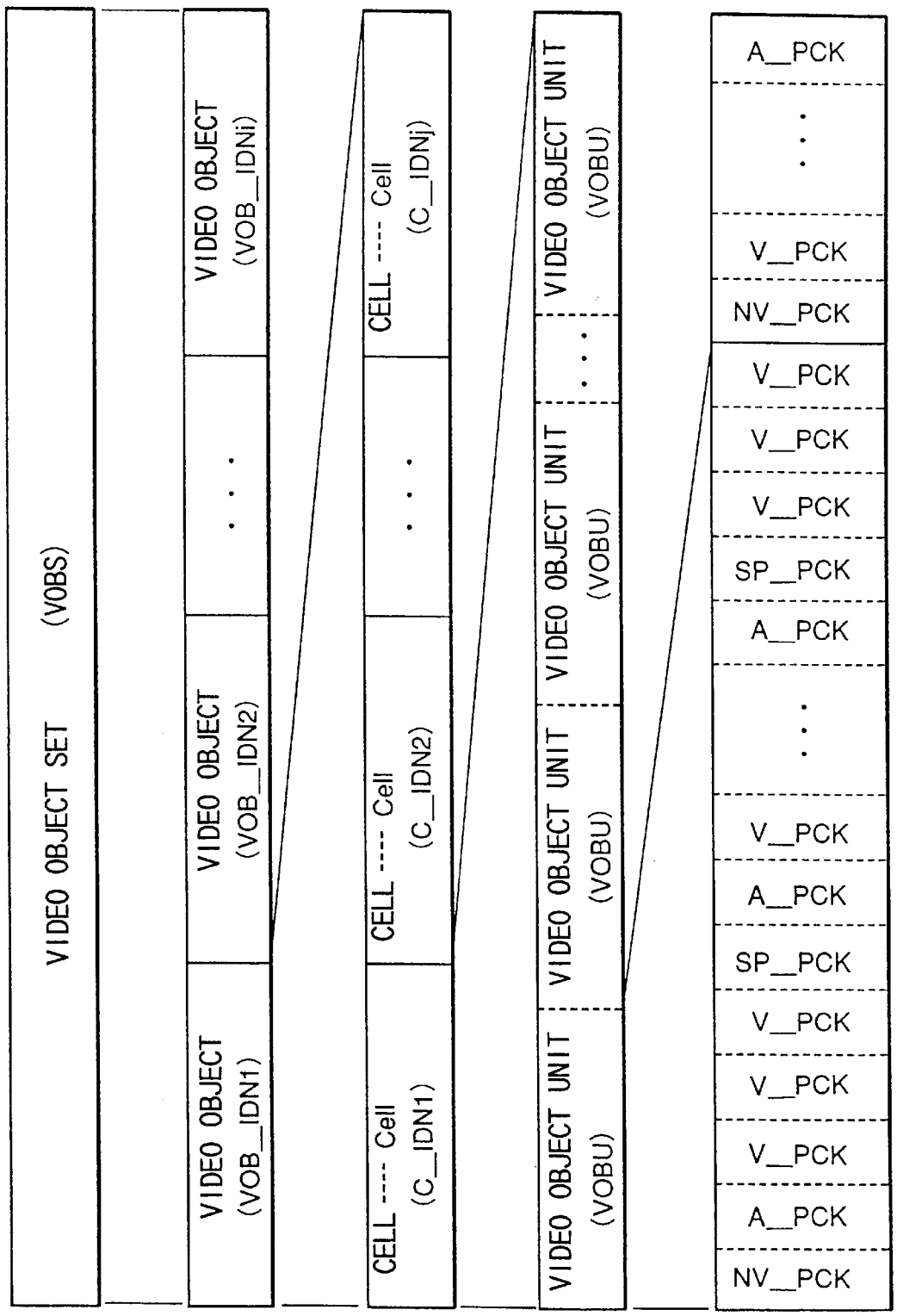
FIG. 4 is a diagram to explain the structure of a video object set recorded on the optical disk.

FIG. 4 is a hierarchical representation of the relationship between the video object set (VOBS) and cells and the contents of a cell (Cell). In the DVD reproducing process, video segmentation (e.g., scene changes, angle changes, or story changes) and specific playback are performed cell by cell or in video object units (VOBU) which fall below the cells level in the hierarchy.

The video object set (VOBS) consists of more than one video object (VOB_IDN1 to VOB_IDNi). One video object consists of more than one cell (C_IDN1 to C_IDNj). One cell (Cell) consists of more than one video object unit (VOBU). One object unit (VOBU) consists of one navigation pack (NV_PCK), more than one audio pack (A_PCK), more than one video pack (V_PCK), and more than one sub-picture pack (SP_PCK).

The navigation pack (NV_PCK) is mainly used as control data used to reproduce and display the data in the video object unit to which the pack belongs and control data used to search for data in the video object unit.

The video pack (V_PCK) is main video information and is compressed in accordance with such a standard as the MPEG standard. The sub-picture pack (SP_PCK) is sub-video information that supplements the main picture. The audio pack (A_PCK) is audio information.

Figure 5:
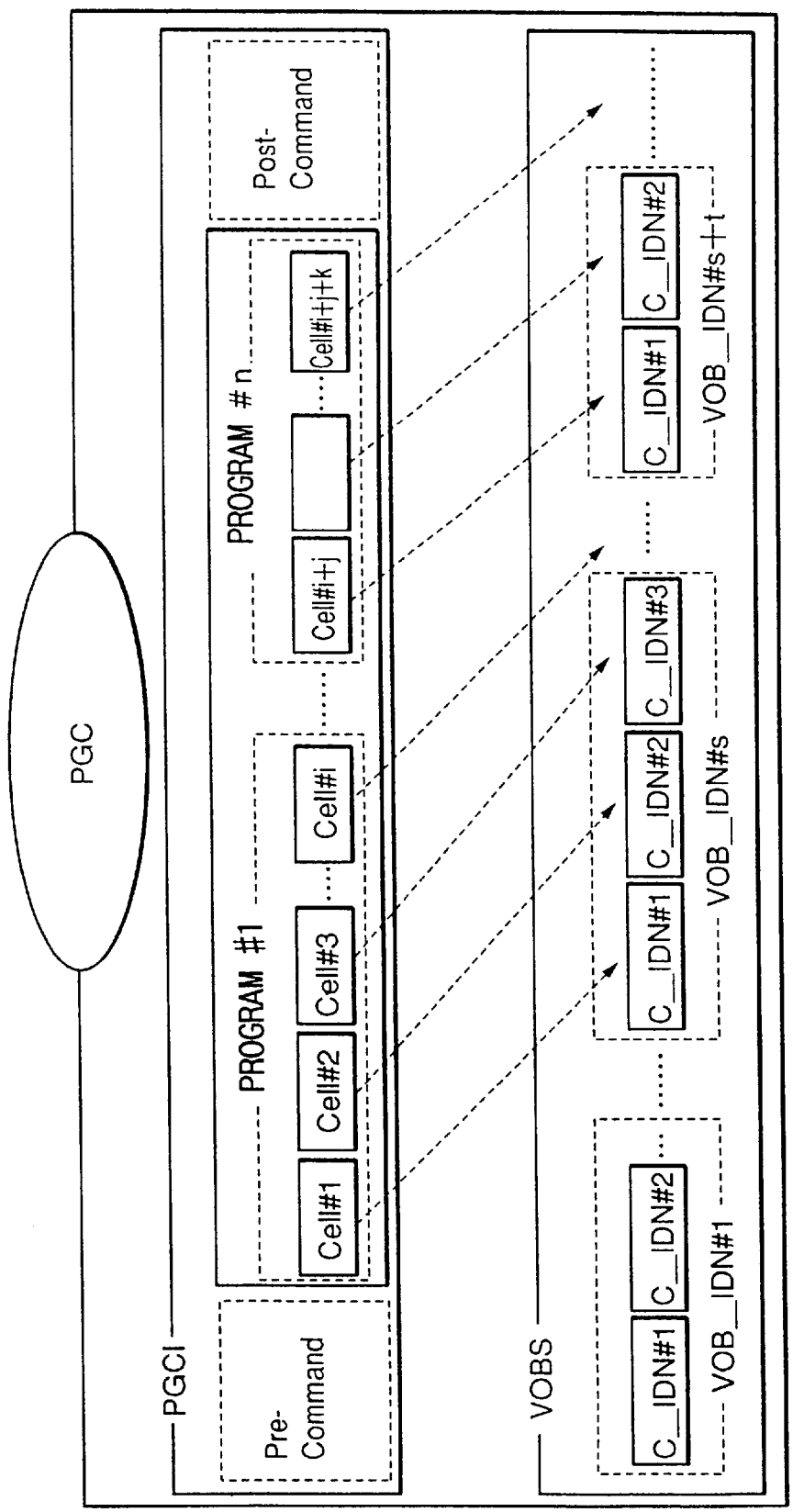
FIG. 5 is a diagram to help explain a program chain including the program chain information recorded in the video title set information on the optical disk and the video object set to be reproduced.

FIG. 5 illustrates how a program chain (PGC) controls the order in which the cells (Cells) are reproduced.

Various program chains (PGC#1, PGC#2, PGC#3, . . . ) have been prepared so that the order of reproducing the data cells can be set in different ways. Therefore, selecting a program chain sets the order of reproducing the cells.

In the program chain information (PGCI), an example of executing program #1 to program #n is shown. In the programs, the cells specified in (VOB_IDN#s, C_IDN#s+1) in the video object set (VOBS) and those subsequent to these cells are specified in sequence.

FIG. 6 shows video title set information (VTSI) in the video title set (VTS). Included in the video title set information (VTSI) is a video title set program chain information table (VTS_PGCIT). Therefore, when a video object set (VOBS) in one video title set (VTS) is reproduced, the program chain specified by the producer or selected by the user is chosen from the program chains listed in the video title set program chain information table (VTS_PGCIT).

In the VTSI, the following data items are also included:

VTSI_MAT—A video title set information management table, in which what type of information exists in the video title set and the start address and end address for each piece of information are written.

VTS_PTT_SRPT—A video title set part-of-title search pointer table, in which title entry points and others are written.

VTSM_PGCI_UT—A video title set menu program chain information unit talbe, in which a menu for a video title set written in multiple languages is written. Therefore, it is possible to check the menu to see what video title sets are written and what order of palyback is used.

VTS_TMAPT—A video title set time map table, in which information on the recording position of each VOBU managed in each program chain and specified at regular intervals of a specific number of seconds.

VTSM_C_ADT—A video title set menu cell address table, in which the start and end addresses for the individual cells constituting a video title set menu are written.

VTSM_VOBU_ADMAP—A video title set menu video object unit address map, in which the start address for the menu video object unit is written.

With the reproducing system, when a program chain has been selected, the program chain sets the order of reproducing the cells. In playback, NV_PCK which is included in the video object unit, is referred to. NV_PCK has the contents of display, information used to control display timing, and information for data searching. Therefore, on the basis of the information in the NV_PCK talbe, V_PCK is retrieved and decoded. When another pack is retrieved and decoded, A_PCK and SP_PCK in the language specified by the producer or user are are retrieved in the language specified by the producer or user. information management table (VTSI_MAT) of FIG. 6 in detail.

In VTSI_MAT, VTS identification information (VTS_ID) to which the table belongs, the end address for the VTS (VTS_EA), and the end address for the VTSI itself (VTSI EA) and others are included.

Moreover, in VTSI_MAT, the number of audio streams (VTS_AST_Ns) exist in the VTS to which the table belongs and a table (VTS_AST_ATRT) listing the attributes of the audio streams are also included.

The audio streams include streams in different languages and streams in the same language but different expressions. Examples of different expression streams are audio for comments and audio for lines. These streams are differentiated from each other on the basis of attribute information.

Moreover, in VTSI_MAT, sub-picture information is further included.

Specifically, the number of sub-picture streams (VTS_SPST_Ns) existing in the VTS to which the table belongs and a table (VTS_SPST_ATRT) listing the attributes of the sub-pictures are included.

The sub-picture streams include streams in different languages and streams in the same language but different expressions. Examples of different expression streams are sub-pictures for comments and sub-pictures for lines. These streams are differentiated from each other on the basis of attribute information.

As described above, the optical disk 100 has the management area and the data area. In the management area, management information used to process various types of data recorded in the data area has been defined.

As management information, the types and attributes of data recorded in the data area have also been defined. When the data recorded in the data area is related to movies (sound, pictures, and sub-pictures (subtitle pictures)), the management information indicates that the data recorded in the data area is related to movies and indicates the language used in the sub-pictures (subtitle pictures). The languages used in the subtitles include English, Japanese, German, and Chinese.

As described above, the optical disk 100 of the present invention has the main picture information as well as the sub-picture information and audio information recorded on it. The main pictures are compressed by, for example, an MPEG scheme and are divided into packets and recorded on the disk. The sub-pictures are produced in a system completely independent of the system related to the main pictures. The sub-pictures are compressed by, for example, a run-length scheme. The sub-picture information includes information in various languages and can be available in any one of the languages. The sub-picture information in the selected language is superimposed on the main picture. To realize this, the sub-picture information is encoded and decoded in a system that is independent of the system related to the main pictures, thereby making it easier to handle the sub-pictures. Each sub-picture pack is assigned a stream ID used to differentiate the pack from the main pictures and audio information. The sub-picture packet in the sub-picture pack is assigned a sub-stream ID. The language can be identified by the sub-picture attributes (VTS_SPST_ATR) in the sub-picture attribute table (VTS_SPST_ATRT) corresponding to the sub-stream ID.

The same is true for the audio information. The audio information is encoded and decoded in a system that is completely independent of the main picture and sub-picture system.

The optical disk of the present invention is characterized by the definition of the attribute of a sub-picture and the contents of the sub-picture recorded under the definition.

Hereinafter, the definition of the types of sub-picture will be explained by reference to FIG. 8.

Figures 8A, 8B:
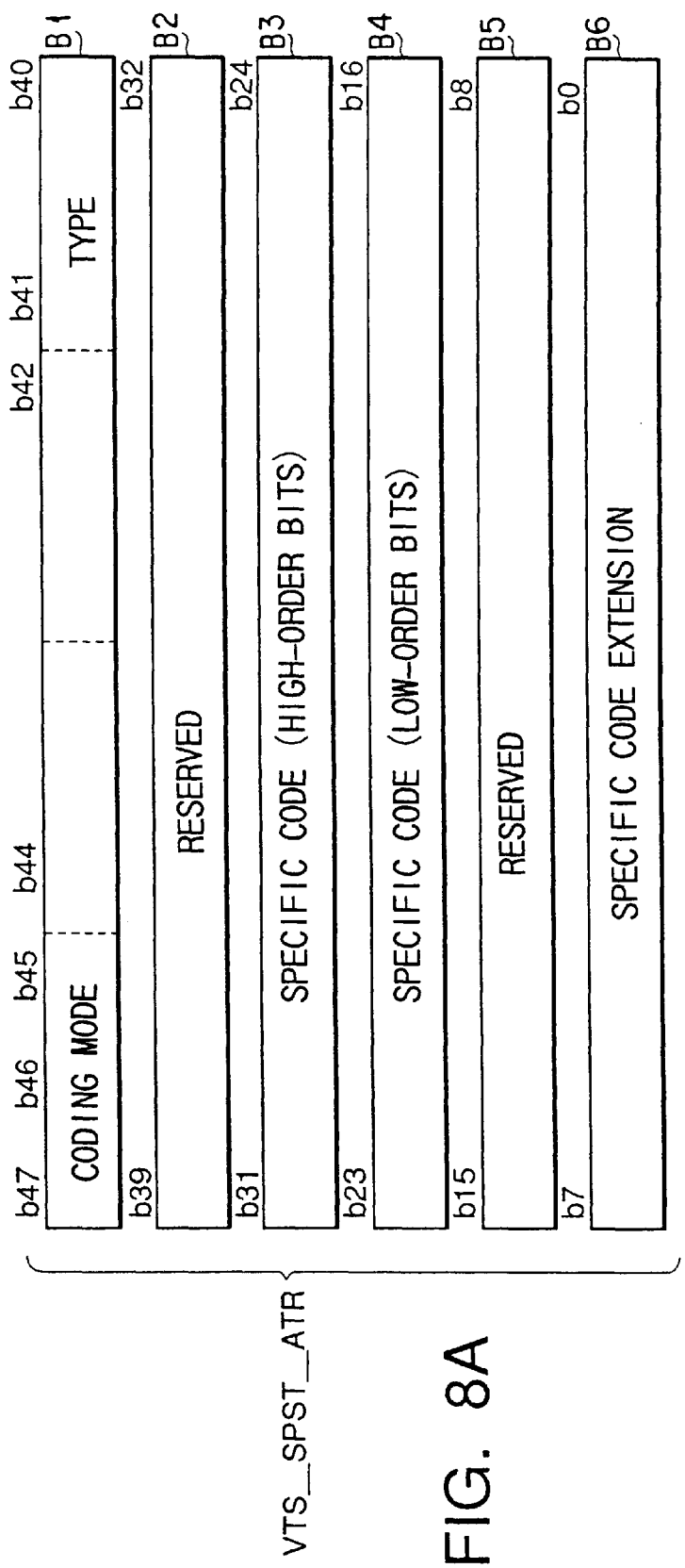
FIG. 8A is an explanatory diagram to help explain the structure of the sub-picture stream attribute table in the video title set information management table.
FIG. 8B is a table to help explain the types of sub-pictures in the sub-picture stream attribute table.

FIG. 8A shows the format used in writing the attribute of a sub-picture. That is, FIG. 8A shows the contents of VTS_SPST_ATRT of FIG. 7.

Hereinafter, information on the contents is referred to as language code. The language code consists of six bytes, (B1 to B6). The table is provided for each stream of sub-pictures. The coding mode in the first-byte (B1) indicates which mode the sub-picture has been processed in. For example, the processing mode includes run-length compression. In the first-byte (B1), the last two bits contain data indicating the type of sub-picture. The type of sub-picture represents whether language code is present or absent. Namely, as shown in FIG. 8B, "00" means that no language has been determined and "10" means that a language has been determined. When no language has been determined, the sub-picture may be a figure. The third byte (B3) and the fourth byte (B4) represent the kind of language. The data items for identifying the kind of language are referred to as specific codes. The specific codes are composed of high-order bits and low-order bits. They are codes representing the kind of language, such as, for example, Japanese (ja), English (en), German (de), French (fr), or Chinese (zh). The high-order bits indicate the first characters and the low-order bits represent the subsequent characters. When such a language has been represented, the sub-picture has been written in the form of data in accordance with ISO-639 (see the table of FIG. 9A).

In the case where a language is not determined in accordance with ISO-639 has been used, then if "FFh" is specified in the third byte (B3) and, for example, "00h" is specified in the fourth byte (B4) as shown in the table of FIG. 9B, then it means that Taiwanese will be used. In this state if, "01h" is specified in the fourth byte, this means that Cantonese is used.

Furthermore, in the sixth byte (B6) of FIG. 8A, a code extension is included.

FIG. 10 shows an example of the contents of the code extension.

Specifically, in the contents of the sixth byte (B6), 00h means that no language has been determined, 02h means that a caption in standard-sized characters is present, 02h means a caption in large-sized characters is present, and 03h means that a caption intended for children is present. Furthermore, 05 means that a closed caption in standard-sized characters is present, 06h means that a closed caption in large-sized characters, and 07h means that a closed caption intended for children.

Moreover, 09h means that there is a mandatory caption. When the code has been written as a specific code extension, the sub-picture to which the code belongs is given priority in the picture output process.

Additionally, 0Dh means that a director's comment in standard-sized characters is present, 0Eh means that a director's comment in large-sized characters, and 0Fh means that a director comment indented for children is present. In 80h to FFh, definitions made by the producer are written.

FIG. 11A and FIG. 11B illustrate examples of sub-picture streams that can be reproduced when an optical disk having the above-described management information is played on the reproducing system.

FIG. 11A shows an example of an optical disk that allows users to choose one of four sub-picture streams. The table in FIG. 11A can also be seen in the form of a menu picture.

As depicted in FIG. 11A, stream No. 0 is an example in which "language present" is determined for type in the first byte (B1), "en" (i.e., English) is determined in the third and fourth bytes (B3) and (B4), and "01h" (standard-sized characters) is determined for a code extension in the sixth byte (B6). Another example is stream No. 1 in which "language present" is determined for type in the first byte (B1), "en" (i.e., English) is determined in the third and fourth bytes (B3) and (B4), and "02h" (large-sized characters) is determined for a code extension in the sixth byte (B6).

As illustrated in FIG. 11A, stream No. 2 is an example in which "language present" is determined for type in the first byte (B1), "ja" (i.e., Japanese) is determined in the third and fourth bytes (B3) and (B4), and "01h" (standard-sized characters) is determined for a code extension in the sixth byte (B6). A further example is stream No. 3 in which "language present" is determined for type in the first byte (B1), "ja" (i.e., Japanese) is determined in the third and fourth bytes (B3) and (B4), and "02h" (large-sized characters) is determined for a code extension in the sixth byte (B6).

Now, suppose an optical disk of the present invention is loaded into the reproducing system and stream No. 3 is chosen and reproduced. As sub-pictures (subtitles) to movies, large-sized Japanese characters also appear on the screen. The reproducing system has the function of storing the determined code for the channel currently being reproduced. In the case of stream No. 3, code "10" representing "language present" as type, code "ja" determined in the third and fourth bytes (B3) and (B4), and code extension "02h" determined in the sixth byte (B6) are stored by the function. This storing function makes it possible to make effective use of the stored information and reduce the operational burden on the operator, particularly when the information on a subsequent optical disk is reproduced or when another picture is chosen on the same optical disk.

The table of FIG. 11B lists language codes determined in the management information for a movie different from the above movie.

For example, when another recorded movie has been chosen on the same optical disk, or when a movie on another optical disk is played back continuously, language codes as shown in FIG. 11B may have been determined in the management information for the movie.

As shown in FIG. 11B, stream No. 0 is an example in which "language present" is determined for type in the first byte (B1), "ja" (Japanese) is determined in the third and fourth bytes (B3) and (B4), and "01h" (standard-sized characters) is determined for a code extension in the sixth byte (B6). Another example is stream No. 1 in which "language present" is determined for type in the first byte (B1), "en" (English) is determined in the third and fourth bytes (B3) and (B4), and "01h" (standard-sized characters) is determined for a code extension in the sixth byte (B6).

Also illustrated in FIG. 11B, stream No. 2 is an example in which "language present" is determined for type in the first byte (B1), "ja" (Japanese) is determined in the third and fourth bytes (B3) and (B4), and "02h" (large-sized characters) is determined for a code extension in the sixth byte (B6). A further example is stream No. 3 in which "language present" is determined for type in the first byte (B1), "ja" is determined in the third and fourth bytes (B3) and (B4), and "03h" (a caption intended for children) is determined for a code extension in the sixth byte (B6).

Now, suppose an optical disk, having streams as shown in FIG. 11A, is played and stream No. 3 is reproduced. As described above, the reproducing system stores the determined code for each stream (in this case, stream No. 3). Therefore, the reproducing system stores code "10" representing "language present" as type, code "ja" determined in the third and fourth bytes (B3) and (B4), and code extension "02h" determined in the sixth byte (B6).

However, Suppose an optical disk having streams as shown in FIG. 11B is played. By referring to each determined code, the reproducing system searches for a stream in which the same contents have been determined. Stream No. 2 in the table of FIG. 11B corresponds to stream No. 3 in FIG. 11A. The reproducing system automatically sets the stream for the sub-picture in stream No. 2 and reproduces it. Such a learning function of reproducing the same language in the reproducing system makes it easy for the user to operate the system.

FIG. 12 shows another example of the contents of code extensions.

For example, when "language present" is determined for type in the first byte (B1) and "Japanese" is determined in the high-order bits of the third byte and the low-order bits of the four byte, one of 01h, 02h, 03h, 04h, and 05h is written as code extension. When 01h has been written, this means that the sub-picture is formed in standard-sized characters; when 02h is written, this means that the sub-picture is formed in middle-sized characters; when 03h is written, this means that the sub-picture is formed in large-sized characters; when 04h is written, this means that the sub-picture is formed in hiragana characters; and when 05h is written, this means that the sub-picture is formed in katakana characters.

FIG. 12 gives a description of Japanese. The same is true for other languages. For example, such identification codes as standard-sized characters, middle-sized characters, large-sized characters, and typeface (italics) have been written. That is, the contents of the table of code extensions will vary according to the language.

The language codes shown in FIG. 8 are recorded in such a manner that they correspond to the different kinds and the different forms of language. Accordingly, the larger the number of the kinds and forms of language, the larger the number of times that the language codes are recorded.

To verify the language codes defined, as described above in the form of a menu, the language codes shown in FIG. 8 are read by the reproducing system, which then displays a language select menu. For example, a menu screen as shown in the table of FIG. 11A or FIG. 11B is displayed. Looking at the menu screen, the user chooses the desired channel and decides on a sub-picture stream.

The menu screen may be recorded in the data area as picture data. It may be produced by decoding the language codes of FIG. 8 in the reproducing system.

Although, the above explanation has been about the code extensions related to sub-pictures, code extensions can also be set for audio information.

Figures 13, 14:
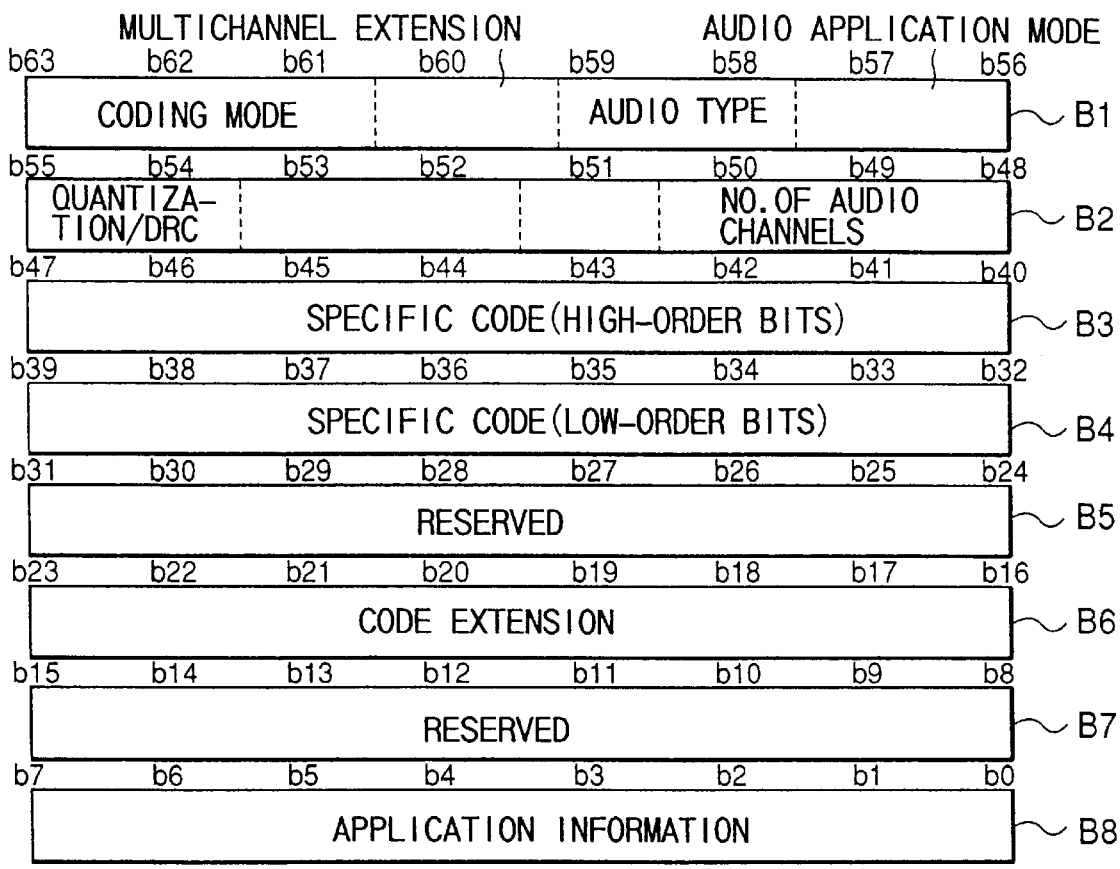
FIG. 13 is an explanatory diagram showing the structure of the audio stream attribute table in the video title set information management table.
FIG. 14 is a table listing code extensions for audio streams.

FIG. 13 shows the format used in writing the attributes of audio codes. That is, FIG. 13 shows the contents of VTS_AST_ATRT of FIG. 7. The table contains eight bytes, (B1 to B8). The table is provided for each audio channel. In the coding mode in the first byte (B1), the mode in which the audio channel has been processed in is written. For example, the processing mode includes Dolby AC-3, MPEG-1, MPEG-2, and linear PCM. In the multichannel extension, whether the audio channel is related to another channel is also included. For example, whether or not the audio channel is related to a channel in which comments or background sound has been recorded is written. Furthermore, in the audio type, whether or not a language is included in audio is also written.

Moreover, in the audio application mode, whether a karaoke mode, a surround mode, or the like is used is also included. In the second byte (B2), an identification code for the number of bits for quantization in a quantization mode or a code indicating the presence or absence of dynamic range control data (VRC) is written in an area labeled as quantization/DRC. Also in the second byte, the number of audio channels is included. The way of writing in the third and fourth bytes (B3) and (B4) is the same as in the case of sub-pictures. That is, identification of languages is included in the third and fourth bytes (B3) and (B4).

The application information in the eighth byte (B8) is used when karaoke has been written for an audio channel. Namely, the audio signal has been recorded in the form of Dolby AC-3, MPEG, or linear PCM or in the form of a solo or a duet.

FIG. 14 shows the description of the code extensions in the sixth byte (B6). In FIG. 14, "00h" means that nothing has been determined, "01h" means standard caption, and "02h" means speech indented for visually handicapped persons. Moreover, "03h" and "04h" mean that director's comments, such as commentary or supplementary explanation, are written.

With the optical disk played on the reproducing system, when a speech channel is selected, a language menu appears. After a language has been chosen, an extension service menu will appear, if the above code extensions have been recorded.

Figure 15:
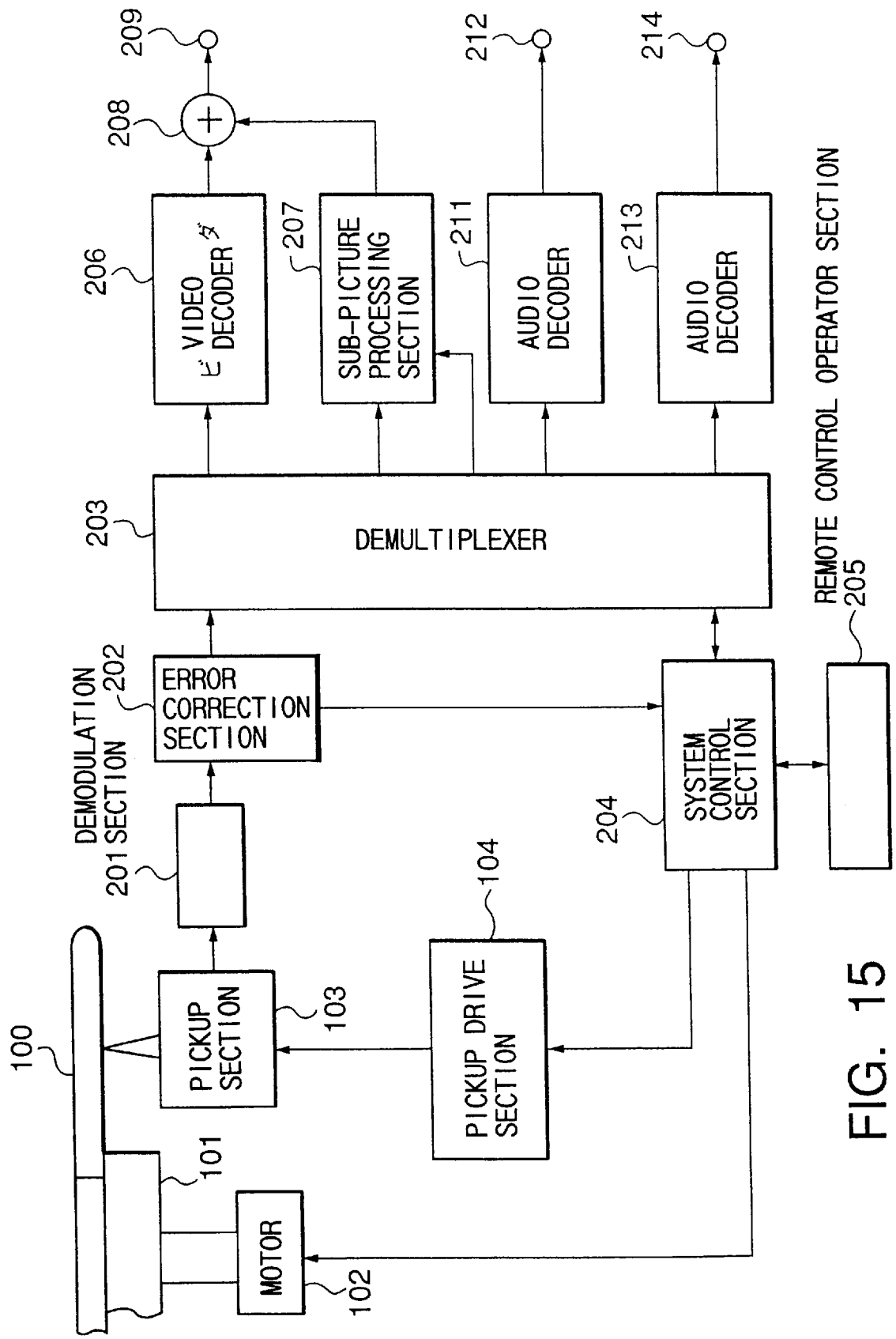
FIG. 15 is a block diagram of a system for reproducing the optical disk.

FIG. 15 shows the configuration of the reproducing system that reproduces the information from the optical disk.

A disk 100 is placed on a turn table 101, which is rotated by a motor 102. Suppose the playback mode is now on. In this mode, the information recorded on the disk 100 is picked up by a pickup section 103. The pickup section 103 is moved radially over the disk by a pickup drive section 104. The pickup drive section 104 also provides focus control and tracking control of the pickup section 103.

The output of the pickup section 103 is inputted to a demodulation section 201, which demodulates it. The demodulated data is inputted to an error correction section 202. The error-corrected data is inputted to a demultiplexer 203. The demultiplexer 203 separates the data into video information packs, subtitle and character information packs, audio information packs, and control and management information packs. The reason for this is that the subtitle and character information (sub-pictures) and audio information have been recorded on the disk 100 in a manner that corresponds to the video information as described earlier. Because the subtitle and character information and audio information are available in various languages, a language to be decoded is selected. The selection is made under the control of a system control section 204.

The user gives operation instructions to the system control section 204 via an operator section 205.

The video information separated at the demultiplexer 203 is inputted to a video decoder 206, which subjects the video information to a decoding process corresponding to the type of a display unit. For example, the video information is converted into a signal suitable for NTSC, PAL, SECAM, or a wide screen. The sub-pictures separated at the demultiplexer 203 are inputted to a sub-picture processing section 207, which decodes them into subtitles and literal pictures. The video signal decoded at the video decoder 206 is inputted to an adder 208, which adds the video signal to the subtitles and literal pictures (=sub-pictures). The addition output is directed to an output terminal 209. The audio information separated at the demultiplexer 203 is inputted to an audio decoder 211, which decodes the audio information. The decoded signal is directed to an output terminal 212. In addition to the audio decoder 211, the audio processing section has another audio decoder 213, which is capable of reproducing speech in another language and supplying the reproduced speech to an output terminal 214.

Next, explanation will be given as to how a sub-picture stream is reproduced when an optical disk as shown in FIG. 1 is played on the reproducing system. Because sub-pictures in more than one language and sub-pictures in the same language but different in the size of characters have been recorded on the optical disk 100, any sub-picture route can be selected when the reproducing system is started.

When the reproducing system starts playback, the management information on the optical disk is read, demodulated, and error-corrected. The resulting information is then supplied to the system control section 204 via the demultiplexer 203. The system control section 204 reads language codes as shown in FIG. 7 to FIG. 11 and recognizes what languages are available in sub-pictures and what forms each language has.

On the basis of the recognition, the system control section 204 obtains a stream table as shown in FIG. 11.

Then, the system control section 204 displays what types of streams are present on the basis of the stream table. For example, driving a character generator, the system control section displays a menu screen corresponding to the table shown in FIG. 11A or FIG. 11B.

Figures 16A, 16B, 18:
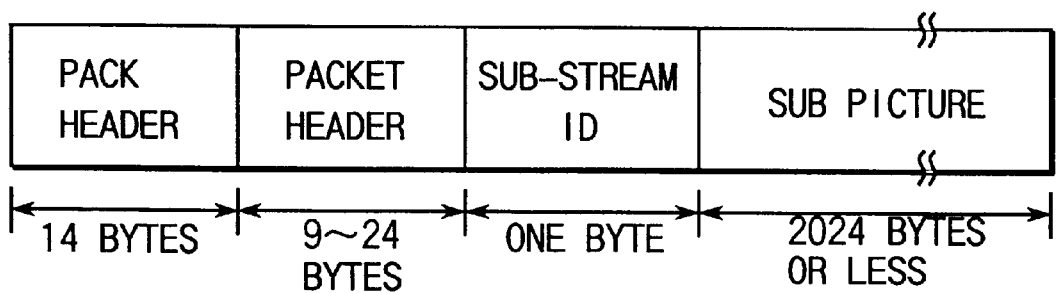
FIG. 16A shows an example of a menu screen produced by the reproducing system using the optical disk.
FIG. 16B shows another example of a menu screen produced by the reproducing system using the optical disk.
FIG. 18 shows the structure of a data packet for a sub-picture.

FIG. 16A and FIG. 16B show examples of the menu screen. The menu screen of FIG. 16A corresponds to the table of FIG. 11A. The menu screen means that selecting stream No. 0 causes English subtitles in normal size to appear and that selecting stream No. 1 causes English subtitles in large size to appear. The menu screen also means that selecting stream No. 2 causes Japanese subtitles in standard size to appear and that selecting stream No. 3 causes Japanese subtitles in large size to appear.

The menu screen of FIG. 16B corresponds to the table of FIG. 11B. The menu screen means that selecting stream No.

0 causes Japanese subtitles in standard size to appear and that selecting stream No. 1 causes English subtitles in normal size to appear. The menu screen also means that selecting stream No. 2 causes Japanese subtitles in large size to appear and that selecting stream No. 3 causes Japanese subtitles indented for children to appear. Subtitles intended for children include, for example, subtitles with explanation of terms or in plain terms and subtitles with explanation of scenes or the pronunciation next to characters.

After the menu screen has appeared, the viewer chooses the desired channel by operating the remote control section 205 to appear. This decides a playback stream for the sub-picture.

In the explanation, the system control section 204 reads the language codes recorded in the management section, examines what routes are available in playback streams for sub-pictures on the optical disk currently being played, and displays the menu screen shown in FIG. 16A or FIG. 16B.

The present invention is not limited to this. For instance, with the menu screen itself recorded in the data area under the above definition, when the reproducing system is started, the menu screen may appear automatically as a result of reproducing pictures. When this method is used, the optical disk is used as a ROM. The method is effective when the contents of the recorded information remain unchanged.

Figure 17:
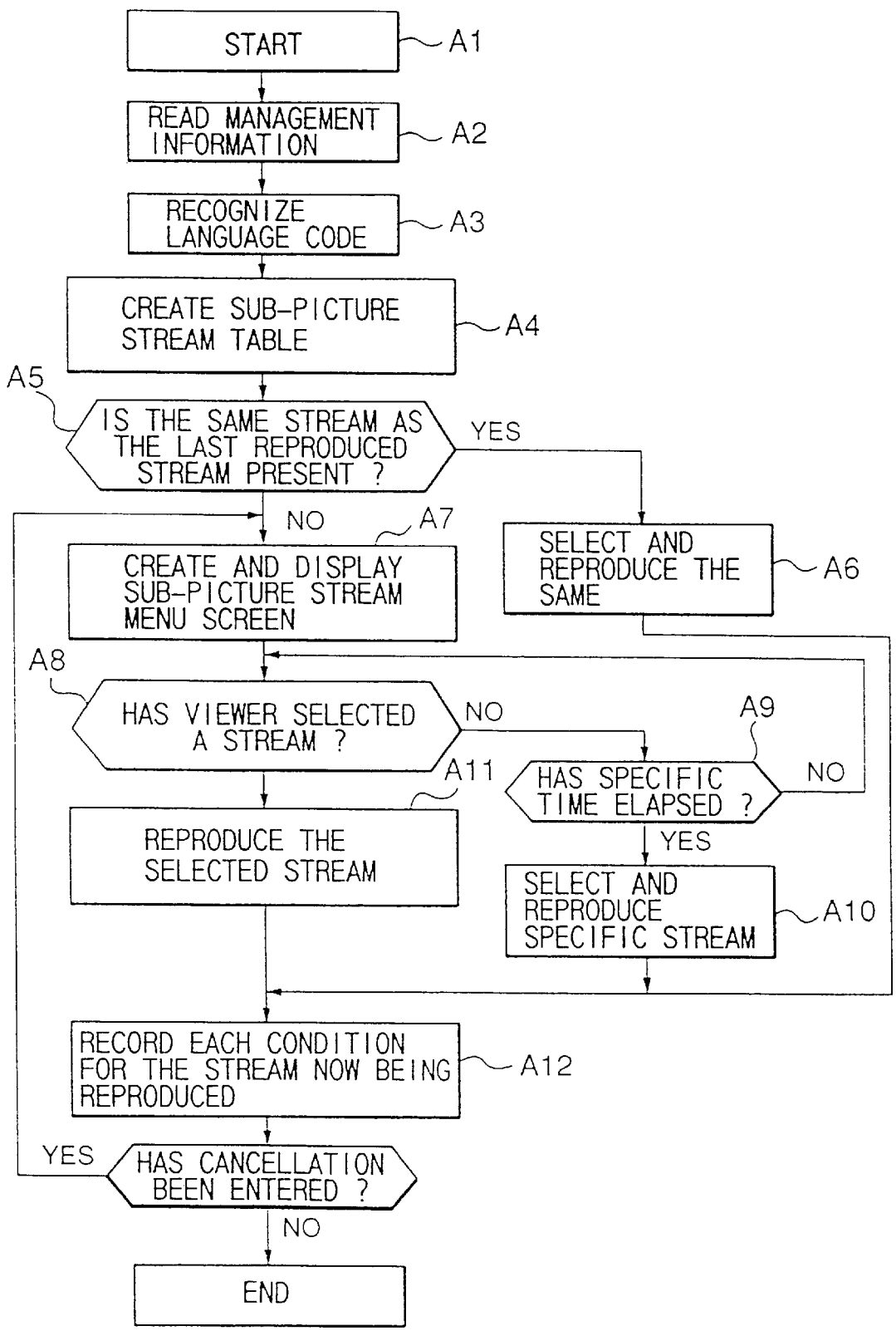
FIG. 17 is a flowchart for an example of the operation of setting a sub-picture stream in the reproducing system.

FIG. 17 is a flowchart for the operation from when the optical disk is played on the reproducing system until the first subtitle (sub-picture) stream has been determined.

When playback is started at step A1, the management information is read (step A2). Then, the language codes (see FIG. 8A) are recognized at the system control section 204, which creates sub-picture stream tables as shown in FIG. 11A and FIG. 11B. At this point, the contents of the stream are known. Then, it is judged whether or not there is a stream with conditions similar to those for the last reproduced stream (steps A3 to A5). If there is a stream with similar conditions, the present stream will be chosen and playback will be started (step A6). If there is no stream with conditions similar to those for the last reproduced stream, a menu screen (see FIG. 16A and FIG. 16B) for sub-picture streams will be created and displayed (step A7). When the menu screen has appeared, the selection of a stream by the viewer is waited for (step A8). After the waiting time has exceeded a specific time period, the playback of a previously set stream is started (e.g., the playback of a stream in the same language as that selected in the preceding session is selected) or the first stream arranged as a menu is selected and its playback is started (steps A9 and A10). When the viewer enters a stream selection, the playback of the sub-picture stream for the selected stream is started (step A11).

Furthermore, to perform a process as described in step A5, each condition for the stream currently being reproduced is stored at step A12. Next, it is judged whether or not the viewer has canceled the selection. The reason for this is that the viewer may have chosen the wrong language or a language in the wrong character size by mistake. If the viewer has canceled the selection, control will return to step A7, where the menu screen display mode will be on. If the viewer has not canceled the selection, the process will be ended.

FIG. 18 illustrates a packet.

The information in the sub-picture is recorded in the data area in the form of a pack train. Specifically, in one pack (SP_PCK), a pack header, a packet header, a sub-stream ID, and sub-picture data are arranged in that order. Referring to the stream ID and the high-order bits in the sub-stream ID, the demultiplexer judges SP_PCK. Then, after a stream to be reproduced has been selected and determined under the control of the system control section 204, the low-order bits in the sub-stream ID of the packet is referred to. Then, the demultiplexer 203 sorts out the packet with the sub-stream ID corresponding to the selected stream and inputs it into the sub-picture processing section 207, which decodes the packet.

The operation of determining a sub-picture stream has been explained above. On the above-described optical disk, an audio stream provided with code extensions has been recorded.

Figure 19:
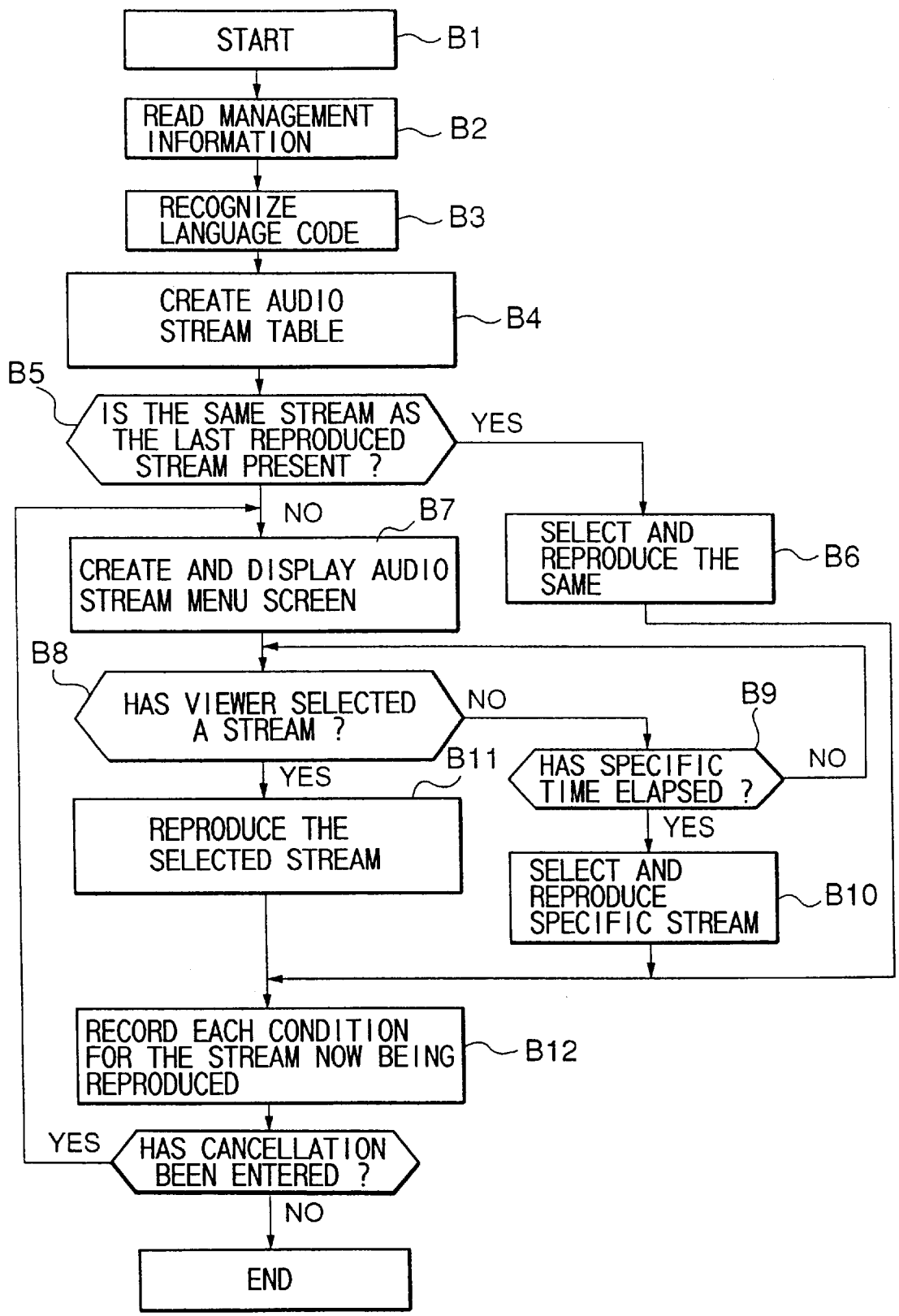
FIG. 19 is a flowchart for an example of the operation of setting an audio stream in the reproducing system.

FIG. 19 is a flowchart for the operation from when the optical disk is played on the reproducing system until an audio stream has been determined.

When playback is started at step B1, the management information is read (step B2). Then, the audio language codes (see FIG. 13) are recognized at the system control section 204, which creates an audio stream table. At this point, the contents of the stream are known. Then, it is judged whether or not there is a stream with conditions similar to those for the last reproduced stream (steps B3 to B5). If there is a stream with similar conditions, the present stream will be chosen and playback will be started (step B6). If there is no stream with conditions similar to those for the last reproduced stream, a stream menu screen (not shown) for audio streams will be created and displayed (step B7). When the menu screen has appeared, the selection of a stream by the viewer is waited for (step B8). After the waiting time has exceeded a specific period of time, the playback of a previously set stream is started (e.g., the playback of a stream in the same language as that selected in the preceding session is started) or the first stream arranged as a menu is selected and its playback is started (steps B9 and B10). When the viewer enters a stream selection, the playback of the audio stream for the selected stream is started (step B11).

Furthermore, to perform a process as described in step B5, each condition for the stream currently being reproduced is stored at step B12. Next, it is judged whether or not the viewer has canceled the selection. The reason for this is that the viewer may have chosen the wrong stream by mistake. If the viewer has canceled the selection, control will return to step B7, where the menu screen display mode will be on. If the viewer has not canceled the selection, the process will be ended.

In the above explanation, it may seem that the determination of a sub-picture stream and that of an audio stream are separate processes. Actually, the process of FIG. 17 and that of FIG. 19 are performed in parallel. Afterwards, an audio stream select screen and a sub-picture stream select screen appear as a menu screen.

FIG. 20 shows another example of using the recording medium and reproducing system. The table of FIG. 20 means that selecting stream No. 0 causes English subtitles in normal size to appear and that selecting stream No. 1 causes English subtitles in large-size characters to appear. The table also means that selecting stream No. 2 causes Japanese subtitles in standard size to appear and that selecting stream No. 3 causes Japanese subtitles in large-size characters to appear. The table further means that selecting stream No. 4 causes Japanese subtitles in hiragana characters to appear. Although not shown, the table further means that selecting stream No. 5 causes German subtitles in normal size to appear and that selecting stream No. 6 causes German subtitles in large-sized characters to appear.

With the recording medium and reproducing system, because it is possible to select and display one among normal subtitles in a language as well as easy-to-see large subtitles, easy-to-read subtitles intended for children, and subtitles with comments in the same language, the utility of the recording medium and reproducing system is improved.

INDUSTRIAL APPLICABILITY

The present invention is applicable to the manufacture and sale of optical disks and to those of recording and reproducing systems for optical disks.

What is claimed is:

1. A multilingual recording medium having a data area containing main picture information, sub-picture information for constructing sub-picture streams, and audio information and having a management area containing attribute information for identifying said sub-picture streams, said multilingual recording medium comprising:

a specific code, included in said attribute information for each of said sub-picture streams, for indicating a language related to a corresponding sub-picture stream from a plurality of different languages; and a code extension, included in said attribute information for each of said sub-picture streams, said code extension indicating at least one of a plurality of sub-picture character sizes and sub-picture descriptions in said language, wherein said sub-picture streams are determined by said specific code and said code extension.

2. The multilingual recording medium of claim 1, wherein said code extension is prepared for each of said different languages in tabular form listing said plurality of sub-picture character sizes and descriptions.

3. The multilingual recording medium of claim 1, wherein said attribute information further includes language type information indicating whether said attribute information includes a code extension.

4. The multilingual recording medium of claim 1, wherein said sub-picture information includes more than one sub-stream for producing subtitle data belonging to a same stream in the same language but differing in said sub-picture character sizes.

5. A reproducing system for a multilingual recording medium having a data area containing main picture information, sub-picture information for constructing sub-picture streams in different languages, and audio information and having a management area containing attribute information for identifying said sub-picture streams, said attribute information including a specific code for indicating a language related to a corresponding sub-picture stream from a plurality of different languages and a code extension for indicating at least one of a plurality of sub-picture character sizes and sub-picture descriptions for each of said sub-picture streams, and said data area having one of said sub-picture streams determined by said attribute information, said reproducing system comprising:

means for reading said attribute information included in said management area;

means for recognizing contents of said attribute information;

means for tabulating information for each of said sub-picture streams based on the recognized attribute information, means for displaying contents for each of said sub-picture streams based on the tabulated information, said displaying means displaying contents of each sub-picture stream in a menu screen; and means for reproducing a selected sub-picture stream, wherein one of said sub-picture streams is reproduced when a selection operation, performed on said menu screen, indicates the selection of one of said sub-picture streams.

6. The reproducing system of claim 5, wherein said reproducing means includes storage means for storing reproduced sub-picture stream attribute information of said selected sub-picture stream being reproduced.

7. The reproducing system of claim 6, further comprising, means for recognizing said sub-picture streams, based on the recognized attribute information;

means for judging whether said recognized sub-picture streams include a sub-picture stream having information identical to said reproduced sub-picture stream, based on said reproduced sub-picture stream attribute information stored in said storing means, and means for automatically starting the reproduction of said identical sub-picture stream.

8. The reproducing system of claim 5, wherein said reproducing means includes means for redisplaying said menu screen when a cancel operation has been inputted.

9. A multilingual recording medium having a data area containing main picture information, sub-picture information for constructing sub-picture streams, and audio information for constructing audio streams and having a management area containing attribute information for identifying said sub-picture streams and said audio streams, said multilingual recording medium comprising:

a specific code, included in said attribute information, for indicating a language related to a corresponding sub-picture stream from a plurality of different languages;

a code extension, included in said attribute information for each of said sub-picture streams, said code extension indicating at least one of a plurality of sub-picture character sizes and sub-picture descriptions in said language;

an audio specific code, included in said attribute information, for indicating a language corresponding to one of said audio streams from a plurality of different languages; and an audio code extension, included in said attribute information for each of said audio streams, for indicating at least one of a plurality different descriptions in said language, wherein each of said sub-picture streams are determined by said sub-picture specific code and sub-picture code extension, and each of said audio streams are determined by said audio specific code and audio code extension.

10. The multilingual recording medium of claim 9, wherein said sub-picture code extension is prepared for each of said different languages in tabular form listing said plurality of sub-picture character sizes and descriptions, and said audio code extension is prepared for each of said different languages in the form of a table listing differences in description.

11. The multilingual recording medium of claim 9, wherein said sub-picture information includes more than one sub-stream for producing subtitle data belonging to a same stream in the same language but differing in said sub-picture character sizes, and said audio information includes more than one sub-stream for producing audio data belonging to a same stream in the same language but differing in description.

12. A reproducing system for a multilingual recording medium having a data area containing main picture information, sub-picture information for constructing sub-picture streams, and audio information for constructing audio streams and having a management area containing attribute information for identifying said sub-picture streams and said audio streams, said attribute information including a specific code for indicating a language related to a corresponding sub-picture stream from a plurality of different languages, a code extension for each of said sub-picture streams indicating at least one of a plurality of sub-picture character sizes and sub-picture descriptions in said language, an audio specific code for indicating a language corresponding to one of said audio streams from a plurality of different languages, and an audio code extension for each of said audio streams for indicating at least one of a plurality different descriptions in said language, wherein each of said sub-picture streams are determined by said sub-picture specific code and sub-picture code extension, and each of said audio streams are determined by said audio specific code and audio code extension, said reproducing system comprising:

- means for reading said attribute information included in said management area;
- means for recognizing contents of said attribute information;
- means for tabulating information for each of said sub-picture streams and audio streams based on the recognized attribute information;
- means for displaying contents for each of said sub-picture streams and audio streams based on the tabulated information in a menu screen; and
- means for reproducing a selected sub-picture stream and a selected audio stream, wherein one of said sub-picture streams and one of said audio streams are reproduced when a selection operation, performed on said menu screen, indicates the selection of one of said sub-picture streams and one of said audio streams.

13. The reproducing system of claim 12, wherein said reproducing means further includes:

- means for storing reproduced sub-picture and audio stream attribute information of said selected sub-picture and audio stream being reproduced;
- means for reading said attribute information included in said management area, when said recording medium has been replaced;
- means for recognizing said sub-picture and audio streams, based on the recognized attribute information;
- means for judging whether said recognized sub-picture and audio streams include a sub-picture and audio stream having information identical to said reproduced sub-picture and audio stream, based on said reproduced sub-picture and audio stream attribute information stored in said storing means, and
- means for automatically starting the reproduction of said identical sub-picture and audio stream.

* * * * *